United States Patent [19]

Yamagishi

[11] Patent Number: 5,220,671
[45] Date of Patent: Jun. 15, 1993

[54] LOW-POWER CONSUMING INFORMATION PROCESSING APPARATUS

[75] Inventor: Shoji Yamagishi, Yokohama, Japan

[73] Assignee: Matsushita Electric Industrial Co., Ltd., Osaka, Japan

[21] Appl. No.: 738,610

[22] Filed: Jul. 31, 1991

[30] Foreign Application Priority Data

Aug. 13, 1990 [JP] Japan .................. 2-213954
Oct. 23, 1990 [JP] Japan .................. 2-285311

[51] Int. Cl.⁵ ............................................. G06F 1/32
[52] U.S. Cl. .................... 395/750; 364/DIG. 1; 364/228.6; 364/230.4; 364/243; 364/273.1
[58] Field of Search ............ 395/750; 371/8.1, 9.1; 364/707

[56] References Cited

U.S. PATENT DOCUMENTS 4,204,249 5/1980 Dye et al. .................. 395/750
4,422,142 12/1983 Inaba et al. ................ 395/325
4,870,570 9/1989 Satoh et al. ................ 395/750

FOREIGN PATENT DOCUMENTS 2130405 5/1984 United Kingdom ........... 364/707

Primary Examiner—Michael R. Fleming
Assistant Examiner—Debra A. Chun
Attorney, Agent, or Firm—Stevens, Davis, Miller & Mosher

[57] ABSTRACT

There is disclosed a low-power consuming information processing apparatus having a storage unit for storing an application program of a main task, a main CPU capable of operating at a high speed for executing the application program, a sub-CPU for executing a process other than the main task, the sub-CPU being of a low-voltage, low-power consuming type, and a peripheral circuit being controlled by the sub-CPU.

4 Claims, 2 Drawing Sheets

LOW-POWER CONSUMING INFORMATION PROCESSING APPARATUS

BACKGROUND OF THE INVENTION

The present invention relates to a battery operated information processing apparatus such as portable terminal equipment, lap-top personal computers and the like, now used widely.

For purposes of miniaturization, such a conventional battery driven information processing apparatus has only a single CPU which is used for executing all necessary processes such as executing an application program, processing an input from a keyboard, processing communications, and processing interruptions.

Even in an information processing apparatus having a sub-CPU for handling keyboard operations, communications and the like, the sub-CPU is controlled by the main CPU at all times. Therefore, the main CPU which consumes a large power occupies a large part of the operating time of the apparatus.

In the conventional information processing apparatus, the main CPU consuming a large power always controls the entirety of the apparatus including a sub-CPU and other peripheral circuits, thus making it difficult to achieve low overall power consumption by the apparatus.

SUMMARY OF THE INVENTION

It is an object of the first embodiment to solve the above-described conventional problems and provide a low-power consuming information processing apparatus capable of considerably suppressing power consumption and allowing a long term operation with a battery.

In order to achieve the above object, the first embodiment provides an information processing apparatus comprising a storage unit for storing an application program of a main task, a main CPU capable of operating at a high speed for executing the application program, a sub-CPU for executing a process other than the main task, the sub-CPU being of a low-voltage, low-power consuming type, and a peripheral circuit controlled by the sub-CPU.

The information processing apparatus of the first embodiment constructed as above operates in the following manner. Namely, an operation not required to be processed at a high speed, such as a normal key entry waiting operation, and a communication operation, is processed by the low-power consuming sub-CPU while stopping the main CPU, and only an operation required to be processed at a high speed, such as a data/file retrieval and correction, is processed by the high speed main CPU which was activated by the sub-CPU. Therefore, an average power consumption can be considerably reduced.

According to the first embodiment, although the sub-CPU handles keyboard operations and communications, it always operates under the control of the main CPU when the application program is executed. As a result, during the main routine such as file retrieval and correction, the period while the high power consuming main CPU operates, occupies a large part of the operating time of the apparatus. According to the first embodiment, the main CPU consuming a large power is required to execute an application program, and to control the sub-CPU and peripheral circuits. There thus arises a problem in that it is difficult to reduce power consumption of the apparatus. It is therefore an object of the second embodiment to provide a low-power consuming information processing apparatus capable of greatly suppressing power consumption of the apparatus, and allowing a long term operation with a battery.

In order to achieve the above object, the second embodiment provides an information processing apparatus comprising a main storage unit for storing an application program of a main task, a main CPU for executing the application program, a custom LSI dedicated to processing an instruction such as a file retrieval and correction frequently used by the main CPU, the custom LSI executing a command from the main CPU representative of the instruction, at a high speed by using hardware, a low-voltage driven, and low-power consuming sub-CPU for executing a process other than the main task, and a peripheral circuit controlled by the sub-CPU.

According to the second embodiment, conventional operations executed by the main CPU are exchanged for conventional operations executed by the sub-CPU, an operation not required to be processed at a high speed, such as a normal key entry waiting operation, and a communication operation, is processed by the low-power consuming sub-CPU while stopping the main CPU, and an operation required to be processed at a high speed such as a data/file retrieval and correction called from the application program, is processed by the high speed main CPU which was activated by the sub-CPU. Furthermore, if an instruction frequently used by the main CPU such as for a routine process including a retrieval, and correction, is to be executed, the main CPU activates the custom LSI for executing such an instruction at a high speed and supplies to the custom LSI a command for the instruction, the main CPU thereafter stops operating until the process corresponding to the command has been completed, and after the completion of the process, the custom LSI again activates the main CPU to make the main CPU execute the post process of the process, and supplies the processed data to the sub-CPU which in turn supplies the processed data to a display or an external interface.

In the manner described above, the main CPU consuming a large power is caused to stop operating during most of the operation modes of the information processing apparatus including a key entry waiting operation, key input processing operation, and display processing operation. Therefore, an average power consumption can be considerably reduced. Furthermore, a process frequently executed by the application program is executed at a high speed by the custom LSI, thereby reducing an average power consumed while executing the application program.

DESCRIPTION OF THE PREFERRED EMBODIMENT

Figure 1:
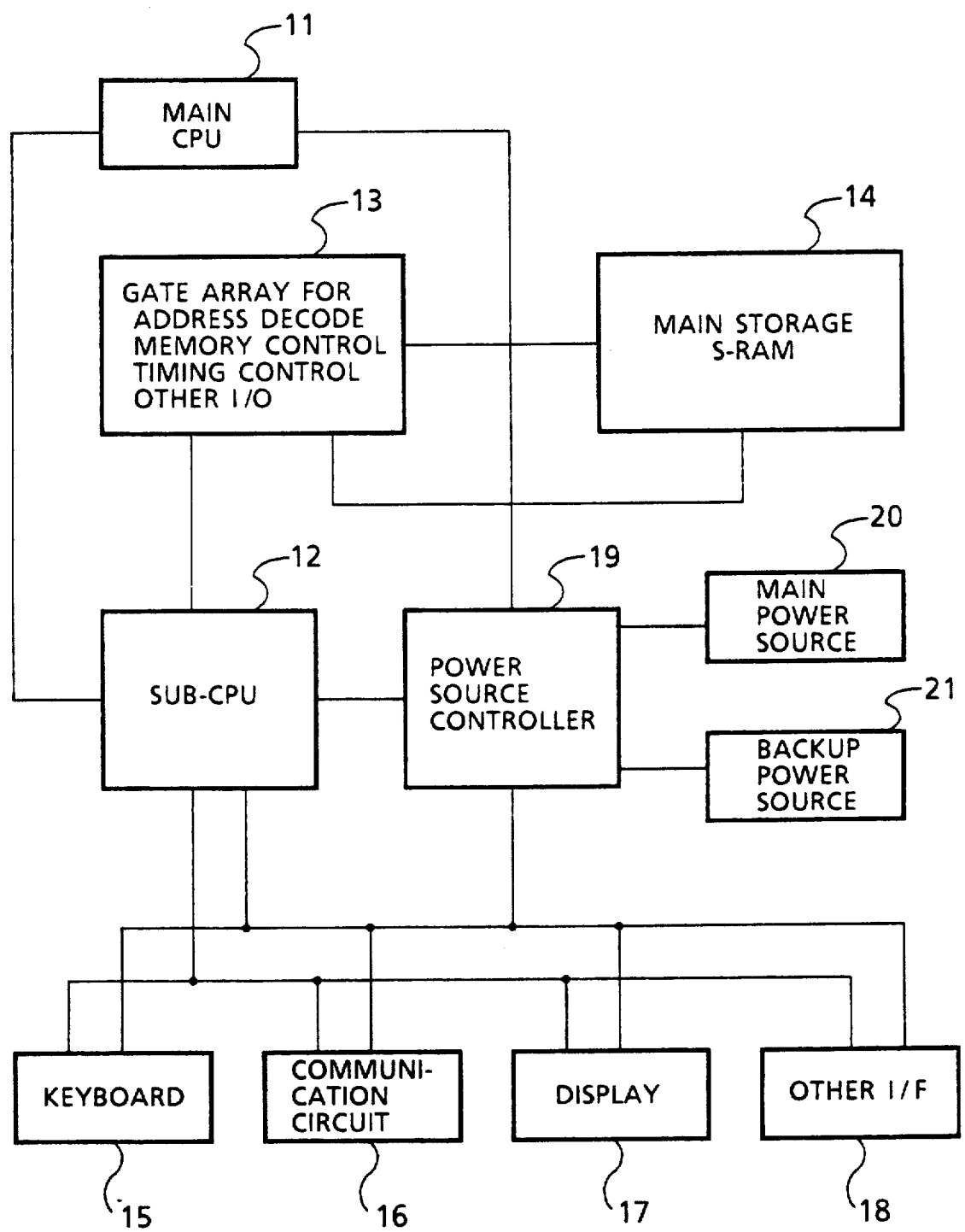
FIG. 1 is a block diagram showing the outline of a low-power consuming information processing apparatus according to a first embodiment of the invention.

FIG. 1 shows the structure of a first embodiment of the invention. In FIG. 1, reference numeral 11 represents a main CPU of 16 bits or 32 bits capable of operating at a high speed, and reference numeral 12 represents a low-voltage driven and low-power consuming sub-CPU of 8 bits or 4 bits capable of operating at a medium speed. Reference numeral 13 represents a gate array having a built-in control circuit such as an address decoder, and reference numeral 14 represents a main storage for storing an application program of a main task. Reference numeral 15 represents a keyboard, reference numeral 16 represents a communication circuit, reference numeral 17 represents a display, and reference numeral 18 represents other interfaces (I/F). Reference numeral 19 represents a power controller, reference numeral 20 represents a main power source, and reference numeral 21 represents a backup power source.

The operation of the embodiment will be described below. Even while the main power source 20 is turned off, the sub-CPU 12 is powered from the backup power source 21 and waits for any key input from the keyboard 15 under a power-down mode. Upon depression of an ON-key of the keyboard 15, the sub-CPU 12 detects the voltages of the main power source 20 and backup power source 21 to check if they are sufficiently high for the whole system to operate. Only if the power source voltage take rated voltages or high, the power controller 19 turns on the main power source 20. Thereafter, the reset state of the whole system is released, and the main CPU 11 and peripheral circuits 15, 16, 17, 18, and 19 are initialized. It is then checked whether or not the main CPU 11 is required for the next operation. If not, the main CPU 11 is set to a stop mode. This stop mode is a mode wherein the oscillation of clocks is stopped, the contents of internal registers and flags are backed up, thereby preparing for an immediate operation after a specific instruction, and so power is hardly consumed. Thereafter, as desired, the power source controller 19 controls changing from the main power source 20 to the backup power source 21, to thereby enter a backup mode which consumes less power. Under this condition, the sub-CPU 12 itself enters the low-power consuming mode wherein it takes a roll of key input processing, power source monitoring, communication circuit monitoring and the like. The power consumed by the apparatus under this condition, is several tens to several hundreds $\mu$A of the sub-CPU 12 and about 10 mA used for refreshing the display 17. Upon depression of any key of the keyboard 15 under this condition, the sub-CPU 12 decodes an entered key code. Only when it is judged that the main CPU 11 is required, the main CPU 11 is actuated and the main storage 14 is made operative. Necessary data is sent to the main CPU 11 to thereafter wait for a completion of the data processing at the main CPU 11. Upon reception of a process end command from the main CPU 11, the main CPU 11 and main storage 14 are again caused to enter the stop mode. If the operation identified upon decoding a key code is not concerned with the main CPU 11, the sub-CPU 12 makes the main storage 14 operative and processes data such as data updating by itself, thereafter returning to a key entry waiting state.

According to this embodiment, the sub-CPU 12 is privileged to control the main CPU 11. Therefore, the main CPU can be held in the stop mode during most of the period while the power is turned on, resulting in a considerable reduction in power consumption.

Figure 2:
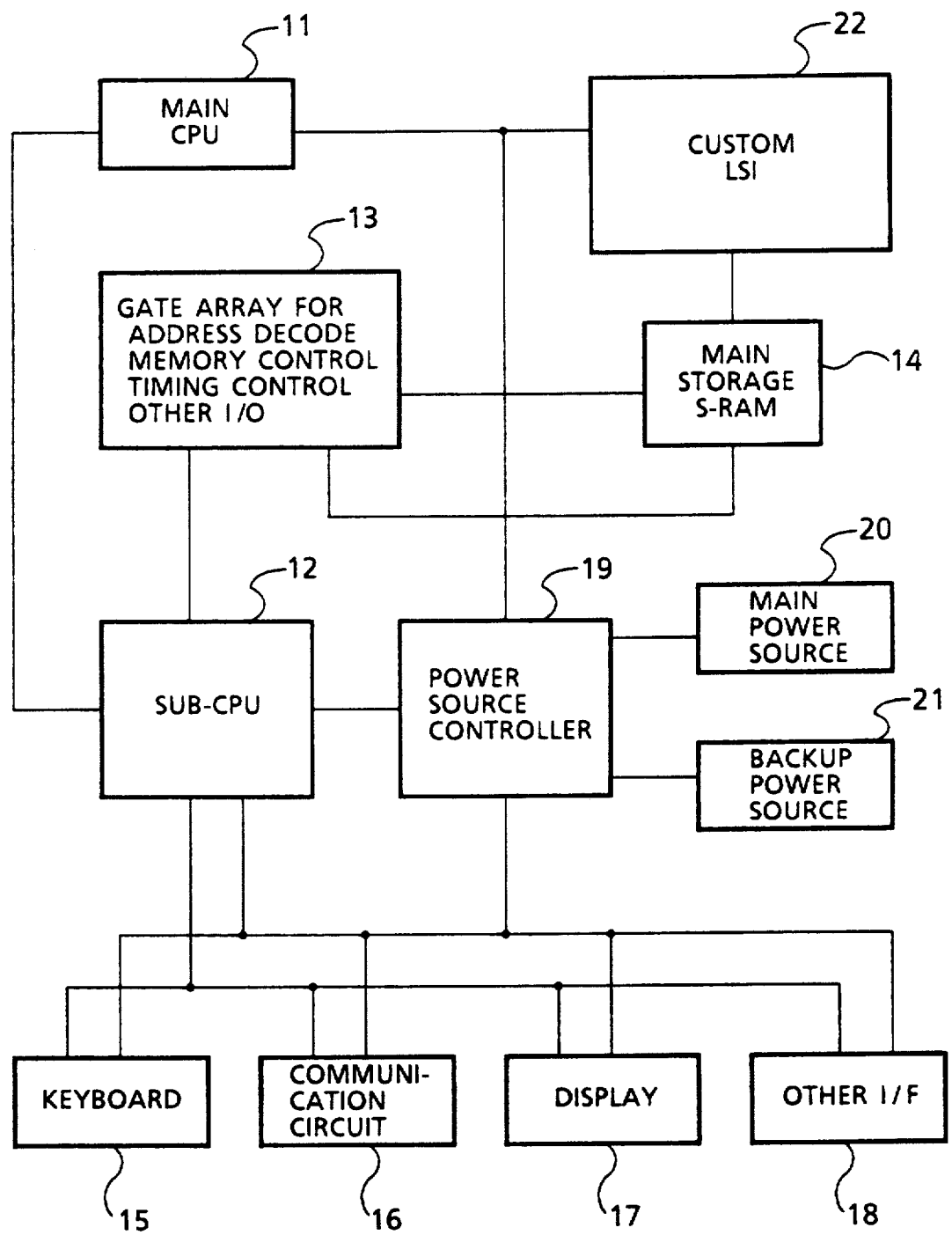
FIG. 2 is a block diagram showing the outline of a low-power consuming information processing apparatus according to a second embodiment of the invention.

FIG. 2 shows the structure of a second embodiment of the invention, like elements to those shown in FIG. 1 being represented by using identical reference numerals. In FIG. 2, reference numeral 11 represents a main CPU of 16 bits or 32 bits capable of operating at a high speed, and reference numeral 12 represents a low-voltage driven and low-power consuming sub-CPU of 8 bits or 4 bits capable of operating at a medium speed. Reference numeral 13 represents a gate array having a built-in control circuit such as an address decoder, and reference numeral 14 represents a main storage for storing an application program of a main task. Reference numeral 15 represents a keyboard, reference numeral 16 represents a communication circuit, reference numeral 17 represents a display, and reference numeral 18 represents other interfaces (I/F). Reference numeral 19 represents a power controller, reference numeral 20 represents a main power source, and reference numeral 21 represents a backup power source. Reference numeral 22 represents a custom LSI dedicated to retrieval, correction, and routing processing.

Next, the operation of the embodiment will be described below. Even while the main power source 20 is turned off, the sub-CPU 12 is powered from the backup power source 21 and waits for any key input from the keyboard 15 under a power-down mode. The sub-CPU 12 detects an entry of an ON-key of the keyboard 15 while the main power source 20 is turned off. Upon depression of the ON-key, the sub-CPU 12 detects the voltages of the main power source 20 and backup power source 21 to check whether or not they are sufficiently high for the whole system to operate. Only if the power source voltages take rated voltages or high, the power controller 19 turns on the main power source 20. Thereafter, the reset state of the whole system is released, and the main CPU 11 and peripheral circuits 15, 16, 17, 18, and 19 are initialized. It is then checked if the main CPU 11 is required for the next operation or not. If not, the main CPU 11 is set to a stop mode. This stop mode is a mode wherein the oscillation of clocks is stopped, the contents of internal registers and flags are backed up, preparing for an immediate operation after a specific instruction, and power is hardly consumed. Thereafter, as a need occurs, the power to the main storage 14 is controlled to change from the main power source 20 to the backup power source 21, to thereby enter a backup mode which consumes less power. Under this condition, the sub-CPU 12 itself enters the low-power consuming mode wherein it takes a roll of key input processing, power source monitoring, communication circuit monitoring and the like. The power consumed by the apparatus under this condition, is several tens to several hundreds $\mu$A of the sub-CPU 12 and about 10 mA used for refreshing the display 17. Upon depression of any key of the keyboard 15 under this condition, the sub-CPU 12 decodes an entered key code. Only when it is judged that the main CPU 11 is required, the main CPU 11 is actuated and the main storage 14 is made operative. Necessary data is sent to the main CPU 11 to thereafter wait for a completion of the data processing at the main CPU 11.

The main CPU 11 executes the data processing in accordance with the contents of the application program. In this case, if the application program includes an instruction frequently used such as a file retrieval, correction and the like which is previously designated by hardware, the main CPU 11 activates the custom LSI 22 and supplies it with necessary commands for such a process. The custom LSI 22 is configured in a microprogramming structure and has a hardware structure including a command register of a long length such as 32 to 64 bits capable of processing a great amount of data using a small number of clocks. For example, the custom LSI 22 can execute a comparison between character strings or the like during several clocks, using a single command. A process can thus be completed in a short time as compared with a conventional process which has been executed using instructions from a main CPU. The main CPU 11 enters the stop mode after a process end signal is returned from the custom LSI 22.

Upon reception of the process end command from the custom LSI 22, the main CPU 11 is again activated to perform the post process of the custom LSI 22, and thereafter the control is passed to the sub-CPU 12.

When a process end command is received by the sub-CPU 12, it causes again the main CPU 11 and main storage 14 to enter the stop mode. If the operation identified upon decoding a key code is not concerned with the main CPU 11, e.g., not concerned with an operation of changing the display contents, the sub-CPU 12 makes the main storage 14 operative and processes data such as data updating by itself, thereafter returning to a key entry waiting state.

According to this second embodiment of the invention, the low-power consuming sub-CPU 12 is privileged to control the main CPU 11. Therefore, the main CPU can be held in the stop mode during most of the period while the power is turned on, resulting in a considerable reduction in power consumption. Furthermore, the data file retrieving and correcting, or other routine processing, which requires a longer time for the main CPU to execute, can be executed by the custom LSI 22 in a small number of clocks. Therefore, an average power required for executing an application program can be reduced.

What is claimed is:

1. A low-power consuming information processing apparatus comprising:
    a first storage unit for storing an application program required for executing a main process of said information processing apparatus;
    a main CPU connected to said first storage unit for executing processes at a high speed;
    a custom LSI circuit connected to said first storage unit and said main CPU and dedicated to processing of a first predetermined process among processes to be performed by said main CPU, said first predetermined process including a file retrieval, correction, re-listing, and numeric operation, which would otherwise require a long time when processed by a program of said main CPU, said custom LSI circuit processing said first predetermined process at a high speed by using its hardware in accordance with a command from said main CPU;
    a low voltage driven, low-power consuming sub-CPU having a second storage unit which stores a second program for executing a second predetermined process other than said main process, said second predetermined process including interpretation of a keyboard input and a key, display, and control of an external interface, said second storage unit being separate from a storage unit in said main CPU, said sub-CPU being capable of executing processes independently of said main CPU;
    a peripheral circuit connected to said sub-CPU and controlled by said sub-CPU independently of said main CPU; and
    a one system, bidirectional type bus interconnecting said sub-CPU and said main CPU.

2. A low-power consuming information processing apparatus according to claim 1, wherein a control relationship exists between said main CPU and said sub-CPU in which an operation not required to be processed at a high speed, such as a normal key input waiting operation and a communication operation, is processed by said low-power consuming sub-CPU exercising a control priority while stopping operation of said main CPU, and an operation required to be processed at a high speed, such as data/file retrieval and correction called from said application program, is processed by said high speed main CPU in response to being activated by said sub-CPU.

3. A low-power consuming information processing apparatus according to claim 1, wherein when said main CPU executes a regular process including retrieval, correction, and numeric operation, said regular process being frequently used by said main CPU in a program and requiring a long time to be processed by software, said main CPU, in a routine of said regular process, activates said custom LSI circuit capable of executing said regular process at a high speed and supplies to said custom LSI circuit a command for executing said regular process, said main CPU thereafter stops operating until execution of said regular process has been completed, and after completion of execution of said regular process, said custom LSI circuit delivers a process completion signal to said sub-CPU, and said sub-CPU again activates said main CPU by issuing an activation command to cause said main CPU to take over data from said custom LSI circuit and to execute post-processing of said process if necessary, and transfers the processed data to said sub-CPU which in turn transfers said processed data received from said main CPU to a display or an external interface, whereby said high power consuming main CPU is controlled by said sub-CPU to stop operating during most operation modes of said information processing apparatus including (a) a key input waiting operation, key input processing operation, and display processing operation and (b) an operation when said custom LSI circuit executes a process which requires a long time when processed by software.

4. A low-power consuming information processing apparatus according to claim 1, wherein a process which is frequently used by said main CPU when said main CPU executes said application program and which requires a long time for processing by software by said main CPU is processed in a short time by using said custom LSI circuit capable of processing by using its hardware at a high speed, whereby an overall operation time of said information processing apparatus and an average power consumption by said information processing apparatus are reduced.

* * * * *